(12) United States Patent
Guiffant et al.

(10) Patent No.: US 6,818,068 B1
(45) Date of Patent: Nov. 16, 2004

(54) CONVEYOR FOR TREATING HOLLOW BODIES COMPRISING AN ADVANCED PRESSURE DISTRIBUTION CIRCUIT

(75) Inventors: Alain Guiffant, Le Havre Cedex (FR); Jean-Michel Rius, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 09/937,433

(22) PCT Filed: Mar. 24, 2000

(86) PCT No.: PCT/FR00/00766

§ 371 (c)(1),
(2), (4) Date: Jan. 4, 2002

(87) PCT Pub. No.: WO00/58631

PCT Pub. Date: Oct. 5, 2000

(30) Foreign Application Priority Data

Mar. 30, 1999 (FR) .............................. 99 04115

(51) Int. Cl.[7] .......................... C23C 16/00; C23F 1/00; C25B 11/00
(52) U.S. Cl. ............. 118/719; 156/345.29; 156/345.31; 204/298.25; 204/298.28; 204/298.07; 204/298.33; 204/298.35; 137/625; 137/625.18; 137/625.42
(58) Field of Search ...................... 204/298.07, 298.25, 204/298.28, 298.33, 298.35; 137/625.12, 625.13, 625.18, 625.19, 625.92; 118/719; 156/345.31, 345.32; 414/939

(56) References Cited

U.S. PATENT DOCUMENTS

| | | | |
|---|---|---|---|
| 2,706,532 A | * 4/1955 | Ringo et al. .................. 96/122 |
| 2,918,938 A | * 12/1959 | Kimball .................. 137/625.11 |
| 3,040,777 A | * 6/1962 | Carson et al. ......... 137/625.15 |
| 3,066,697 A | 12/1962 | Chapman | |
| 3,460,574 A | * 8/1969 | Risher .................... 137/625.66 |
| 4,189,897 A | 2/1980 | Harrison et al. | |
| 4,614,204 A | * 9/1986 | Dolejs .................... 137/625.11 |
| 5,827,358 A | * 10/1998 | Kulish et al. .................. 96/115 |
| 5,855,681 A | * 1/1999 | Maydan et al. .............. 118/719 |
| 6,203,619 B1 | * 3/2001 | McMillan .................... 118/719 |
| 6,537,451 B1 | * 3/2003 | Hotier ..................... 210/198.2 |

FOREIGN PATENT DOCUMENTS

| EP | 0 359 242 | 3/1990 |
| FR | 2 291 919 | 6/1976 |
| GB | 1 159 562 | 7/1969 |
| WO | WO 95/22413 | 8/1995 |

* cited by examiner

*Primary Examiner*—Parviz Hassanzadeh
*Assistant Examiner*—Karla Moore
(74) *Attorney, Agent, or Firm*—Sughrue Mion, PLLC (57) ABSTRACT

A conveyer for treating hollow bodies, comprising several identical treatment stations (12, 13) that process at least one hollow body, whereby the respective treatment station for a given treatment stage communicates with a pressure source via distribution means that include a tight revolving extention. The invention is characterized in that the machine includes at least two independent and equivalent pressure sources (A1, A2) for the given treatment stage. The invention is also characterized in that it is divided up into the same number of treatment stations (12, 13) as the number of pressure sources existing for the machine and in that the distribution device (18) are such that each pressure source (A1, A2) is associated with a specific group.

21 Claims, 5 Drawing Sheets

CONVEYOR FOR TREATING HOLLOW BODIES COMPRISING AN ADVANCED PRESSURE DISTRIBUTION CIRCUIT

The invention relates to a carousel for treating hollow containers, comprising several identical treatment stations, each of them designed to handle one or more hollow containers, and of the type in which, for at least one stage of the treatment, the treatment station is connected to a pressure source, by means of a sealed swivel coupling.

In certain applications, the target is that at each instant, only one station will be connected to a given pressure source, in order to guarantee, for example, a given level of pressure at the relevant treatment station. That is especially true when the pressure source available is only able to furnish a limited amount of fluid at the desired pressure. Such a situation is found for example, when the target pressure level is lower than atmospheric pressure.

With an eye on profitable industrial utilization, in all cases, one seeks to obtain from the in machine, the best possible performance level, while using the least expensive means possible.

Increasing the number of stations is the first draft solution to this problem. However, in this case, each treatment station on the carousel is to be found at a particular stage of the treatment process, specifically, within the framework of the series of steps, during which there occur continuous variations in the characteristic parameters of the treatment process.

This is notably the case for pumping in steps, because a vacuum cannot be created instantaneously. Hence, each step has a duration, and in that time, the pressure level is continuously evolving.

If the number of stations is significant enough, it is possible that two consecutive stations will be so close together, that they will be carrying out the same stage, but at different steps of that stage. The two stations are therefore at different pressure levels.

Now in this case, it is not possible to connect the two stations to the same pressure source, because the pressure in the two consecutive stations would tend to come into equilibrium almost instantaneously, as soon as the second of the two stations would be connected to the source. The first station would therefore lose almost all the benefit accrued from having carried out the steps of the process up to that point.

Document U.S. Pat. No. 5,585,066, describes a machine for blow molding plastic receptacles. This machine involves a distributor of fluid pressure, which is provided with a stationary crown, which has in it, on a transverse face, two concentric annular grooves of different diameters. Each of these two grooves is divided into a certain number of sections, which are each connected to sources with a different pressure level, or even possibly to the atmosphere. The machine described is not designed to work with only one treatment station. It can be seen that the distributor, moreover, includes a rotating device, which is provided with two communication ports, each of which must rotate relative to one of the grooves, in line respectively with the sections of the corresponding groove. The distributor described, permits the connection of the treatment station with a primary high-pressure air source, of about 6 bars, and to a second source of air at low pressure, of about 3 bars, or to the atmosphere.

It can be seen that the machine described does not solve the problem of operating several stations, when the target is that no more than one station, at any instant, will be connected to one given pressure source.

In effect, in such a case, it would be necessary to provide for the relevant section of the groove, a sufficient angular separation that would correspond to the duration of the step under consideration.

Now, in order to have only one station connected to the pressure source, which is connected to the section of the groove, one would be obligated to provide for the pressure intake ports connected to two consecutive stations, to be separated by an angle at least equal to the angular separation of the section. Thus, a limit would be imposed on the number of stations, which could be installed on the carousel.

The only solution which a skilled technician could have found to this problem, based on current state of the art, would be to significantly increase the power of the source, in such a way that the duration of the step might be less than the time for two consecutive stations to pass the same point. This solution would, therefore, have led to an exponential growth in the cost of the pumps put into operation, all the more since it would be necessary to take into account the added losses of charges, which accompany the necessary pumping increase.

Therefore, this invention has as its purpose, to propose a machine which might involve a significant number of stations, all the while guaranteeing that one pressure source would be connected, at any given instant, to only one treatment station.

To that end, the invention proposes a machine of the type described above, but characterized by the fact that, for the said stage, the machine would have at least two independent and equivalent sources of pressure, in that the stations are distributed in such a way, and into just as many groups as the machine has sources, in that the means of distribution are such, that each source is associated with a distinct group.

According to other characteristics of the invention:

the means of distribution are such that, at each instant, one of the said sources is connected to only one station;

the means of distribution are such, that at least one station of one group can be connected to its associated source, at the same time as at least one station of another group is connected to its own relevant associated source;

the swivel coupling involves as many paths as the machine has sources for separately feeding groups of stations, and the means of distribution involves, downstream of the swivel coupling, a means of individual speed control associated with each station.

the swiveled sealed coupling is realized in the form of a rotating distributor involving two co-axial crowns, one stationary, and the other rotating, which are in sealed contact with each other, by adjacent contact surfaces; the rotating crown has communication ports, each one of which is connected to one station, which are distributed in at least as many series, as the machine has sources for the said stage, and have their endpoint on the contact surface of the rotating crown; all the ports of one same series correspond to stations of one same group, and follow the same trajectory; the ports of two different series follow different trajectories; the stationary crown has light sources which are connected to a pressure source, and all of them terminate on the contact surface of the stationary crown in such a way, as to find themselves on the trajectory of a series of ports of the rotating crown, so that one station is connected to one pressure source, when the corresponding port finds itself to be in line with the relevant light; the stationary crown involves at least as many distinct series of at least one light, as the number of the series of ports, and two sources of pressure which pertain to the same stage, are each connected to one light of the two distinct series of lights of the stationary crown:

the ports of all the stations of one same group belong to the same series;

the contact surfaces of the two crowns are annular faces, perpendicular to the axis of rotation of the carousel;

the ports of one same series are designed in a circle, and two series of ports are designed as two circles with different diameters;

the ports of one same series are angularly distributed in a regular manner, around the axis of rotation of the carousel, and the ports of two different series, involving the same number of ports, and angularly intercalated;

the lights which pertain to two independent and equivalent pressure sources, and utilized for the above-cited stage, are fitted at the same angular displacement, and on different diameters, corresponding respectively, to the diameters of circles along which the series of ports corresponding to the said sources are fitted;

two consecutive ports of one same series are separated by an angular displacement at least equal to the extent of angular displacement of the corresponding light of the said series;

the treatment includes a second stage, during which the treatment stations are connected by means of a rotating distributor, with secondary sources of pressure for reaching a second pressure level, the stationary crown also has, in the prolongation of each of the primary lights, secondary lights which are each connected to one of the secondary sources of pressure, and the two lights associated with one same series of ports are separated by an angle which prevents the simultaneous connection of one port with two lights;

the sources of pressure have an internal pressure lower than atmospheric;

treatment includes a stage in which a cold, low-pressure plasma is created, for the purpose of coating the hollow container; this includes at least one pumping stage for lowering the internal pressure of the treatment station, and the pumping step is achieved by utilizing at least two pumps, each one of which is associated with one distinct group of stations, in conformity with the other characteristics given above.

The invention also proposes a rotating distributor for a carousel machine to treat hollow containers, the machine involving several identical treatment centers, each one designed to handle at least one hollow container, of the type in which the distributor includes two coaxial crowns, the one stationary, and the other rotating, which are in contact with each other in a sealed manner, through the contact of adjacent surfaces, of the type in which the rotating crown includes some communication ports, each of which are designed to be connected to a station, and which open out into the contact surface of the rotating crown, of the type in which the stationary crown includes at least one light whose purpose is to link up with one of the machine's pressure sources, and which terminates at the contact surface of the stationary crown, in such a way as to find itself on the same trajectory as the ports of the rotating crown, in such a way that one station is connected to the pressure source while the corresponding port is found in line with the light, all of this characterized by the ports of rotating crown being distributed in at least two series, where the ports of one same series follow the same trajectory, while the ports of two different series follow different trajectories; in that the stationary crown includes as many distinct series, of at least one light, as the number of the series of ports, each of the lights being situated on the trajectory of one of the series of ports, and in that the two sources of independent and equivalent pressure are each connected to one light of the two distinct series.

According to still other characteristics of the invention's distributor:

the contact surfaces of the two crowns are annular surfaces, perpendicular to the axis of rotation of the carousel;

the ports of one same series are designed in a circle, and two series of ports are designed as two circles with different diameters;

the ports of one same series are angularly distributed, in a regular manner, around the axis of rotation of the carousel, and the ports of two different series, involving the same number of ports, are angularly intercalated;

the lights which pertain to two pressure sources, utilized for the above-cited stage, are fitted on the same angular displacement, and on different diameters corresponding, respectively, to the diameters of circles according to the series of ports to which said sources correspond;

two consecutive ports of one same series are separated by an angular displacement at least equal to the extent of angular displacement of the corresponding light of the said series of ports;

the stationary crown includes, for each of the series of lights, at least two lights, one being the extension of the other, and two lights of the same series are separated by an angle that prevents a port from being connected to two lights at the same time.

Other characteristics and advantages of the invention will appear upon reading the detailed description, which follows, as well as in the appended drawings in which.

Figure 1:
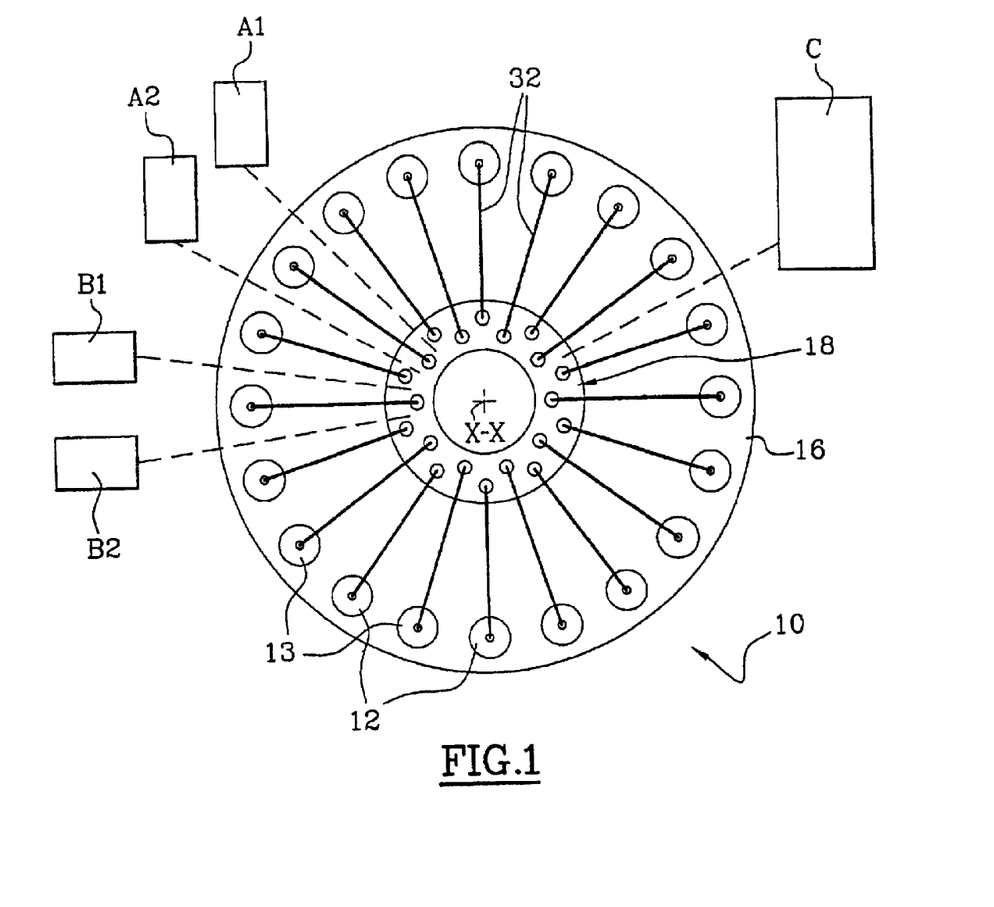
FIG. 1 is a schematic view of a multi-station machine according to the invention.

In FIG. 1, we have illustrated very schematically, an example of a machine realized along the lines of the invention.

Machine 10 shown here, is designed to treat a hollow container, the treatment consisting of using a low-pressure plasma to deposit a film on the hollow container. The hollow containers in question, can be receptacles, such as bottles or flasks, and they can be made of plastic, such as polyethylene terephthalate.

The use of a low-pressure plasma requires operating in a reaction cavity in which the absolute pressure is preferably less than a millibar.

For industrial utilization, the machine is designed to permit the treatment of several thousands, or even several dozens of thousands of hollow containers per hour. To this purpose, Machine 10 involves a number of treatment stations 12, 13, in this example twenty stations, which are carried by a carousel 16, which is rotated around an X-X axis. Stations 12, 13, are identical and are fitted on a circle around the X-X axis. Each of them is designed to receive at least one hollow container, so that it might be subjected to the intended treatment during the course of rotation of carousel 16. It would be possible for treatment station 12, 13, to treat several hollow containers, either inside one reaction cavity, or inside several of them.

In the illustrated example, the machine is designed to carry out a coating treatment in three principal steps: a first step of pumping, a second step of pumping, and a coating step. The purpose of the two pumping steps is to establish within the reaction cavity of the relevant station, a sufficient vacuum to permit the creation of a plasma.

The first pumping step is designed to create a first level of vacuum within the cavity, for example, lowering absolute pressure to the order of one fiftieth of a millibar. The second pumping step, for example, is designed to attain an absolute level of pressure on the order of 0.1 millibars. Finally, during the coating stage, the absolute pressure should be maintained at about 0.1 millibars.

Each treatment stage on the machine, is carried out while the relevant station goes through a specific angular displacement around the X-X axis.

It must be understood that the carousel's motion through two other angles, is for the purpose of the charging and discharging stages of the hollow container, since the machine receives the hollow containers in continuous flow, and evacuates them itself after treatment. Therefore, this latter must occur in less time than it takes the carousel to make a complete turn on its axis.

For different stages of treatment therefore, the stations must be connected to the pumps. Now, the weight and the volume of the pumps prohibit them from being put on carousel 16. Therefore the pumps have to be stationary, and they are designed to be connected to the treatment stations 12, 13 by means of a a swivel coupling 18.

In conformity with the invention, machine 10 is designed so that stations 12, 13 will be distributed into two groups, and, for one same pumping stage, it implies two independent and equivalent pumps, the two groups of the stations being differentiated as a function of the two pumps to which their stations are connected during the stage under consideration.

It is possible that there could be more pumps and thus more groups of stations.

To take advantage of this possibility, the machine is so conceived that two stations of one same group cannot both be connected at the same time to the pressure source that corresponds to this group.

Thus, by separating the stations into several groups, it was possible to plan for enabling the means of distribution, at any given instant, to connect two stations of two different groups to their respective associated sources.

Thus, in the example proposed, stations 12, 13 are divided into two alternate groups, which we will arbitrarily call Even Station 12 and Odd Station 13, hence one station of one group being intercalated between two stations of the other group.

The first pumping stage is thus assured, for the even group of stations, 12, by a first pump A1, and, for the odd group of stations 13, by a second pump A2.

In the same way, the secondary pumping step is assured by two pumps B1 and B2.

The two pumps, associated with a same stage of treatment, are independent from each other. They are also equivalent, in that they allow for maintaining the same level of pressure at the station, irrespective of the group to which the station belongs.

On the other hand, in the example chosen, the coating stage is assured by one pump only, C, which is set up to be connected to each of the stations. Note that this single pump, C, is set up to be connected, at each instant, to several stations.

The invention can be put into operation in different ways.

In a first mode of realization (not drawn), the sealed swivel coupling can be a simple coupling with two paths, permitting the connection of two circuits of stationary fluids, in this example pumps A1 and A2, to two circuits of fluid present upon the carousel, that is to say, to two groups of stations.

Such a coupling includes for example, two coaxial crowns provided each one by two annular continuous grooves, each of the grooves of a crown being adjacent to a groove in the other crown, in order to thus form annular spaces for fluid transfer from one crown to the other. It should be clear that the two annular spaces are connected respectively to two pumps A1 and A2 by means of the stationary crown.

In this mode of realization, it is also possible to foresee that the means of distribution will also include, at the level of each station, some individual actuated valves, within a conduit connecting each station to the corresponding annular space of a swivel-coupling. Each of these valves is thus operated when necessary, for opening or closing the connection to the station under consideration to the corresponding space. The valves might be electromagnetic or mechanical, controlled by stationary cams distributed around the carousel. However, in a preferential mode of realization of the invention, the machine 10 includes an advanced rotating distributor, illustrated in more detail in FIGS. 2 to 4.

Contrary to a simple rotating coupling, rotating distributor 18 does not have as its sole function the connecting of one circuit of stationary fluid to another circuit of fluid traveling on the rotating carousel. Its function is also to determine at which moment of the carousel's rotary motion, a given treatment station is connected to a given pump.

Distributor 18 includes two annular crowns, the one stationary, 20, and the other rotating, 22. The two crowns are coaxial along the X-X axis of rotation of carousel 16; this axis being preferably vertical, and they are stacked axially, one on top of the other. It is preferable to locate the rotating crown, 22, which turns with carousel 16, above the stationary crown in such a way that the two crowns rest against each other, via the transverse contact surfaces 24 and 26, which are annular and perpendicular to the X-X axis.

Figure 3:
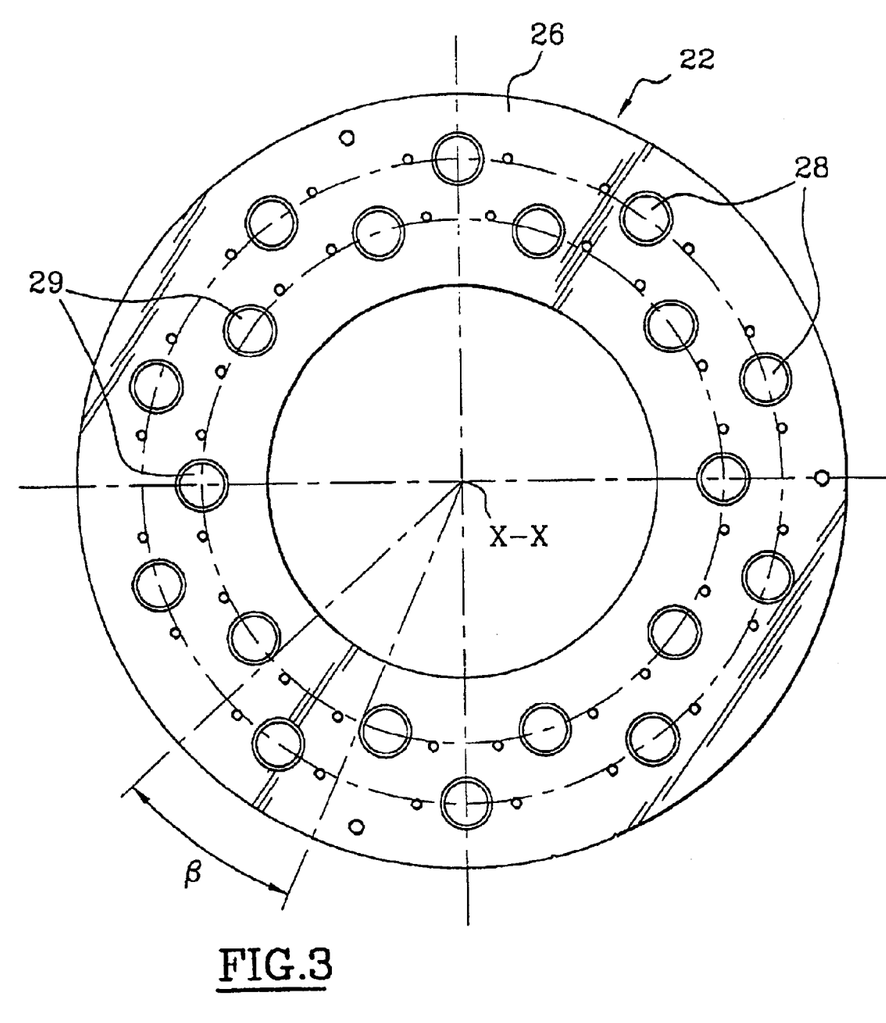
FIG. 3 is a view of the distributor's rotating crown's contact surface.
Figure 4:
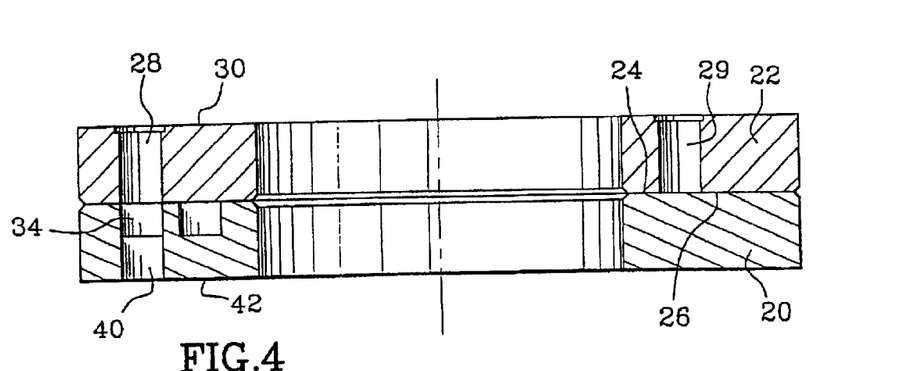
FIG. 4 is an axial cross-sectional view of the distributor.

It can be seen in FIGS. 3 and 4, that the rotating crown, 22, is pierced by a series of ports, 28, 29, which axially traverse it from one side to the other to terminate, on the one hand, in the lower face of contact 26, and on the other hand, in upper face 30.

Each of the ports 28, 29, of which there are 20 in the example, is designed to be connected to one of the treatment stations, thanks to a conduit, 32, which is stationary and sealed, on upper face 30.

It can be seen in FIG. 3, that according to the invention, the ports are distributed in two series. The first series of ports 28 is fitted on a large diameter circle, while the second series of ports 29, is fitted on a small diameter circle. Note that ports of one same series are distributed angularly in a regular manner, in the case at hand, every 36 degrees. Moreover, the two series have an equal number of ports, and they are staggered angularly vis-à-vis each other, in such a way that for all the series taken together, there will be a port every 18 degrees, which corresponds to the angular distance between two stations on the carousel.

According to the invention, all the ports of one same series correspond to the stations of one same group. In the example at hand, it can be seen, conversely, that all the stations of one same group, that is to say, all the stations associated with one and the same pump, are fed by a port of one same series. However, one can imagine that the stations of one same group might be fed by the ports pertaining to two distinct series, that is to say, for example, the ports distributed along circles of different diameters.

Figure 2:
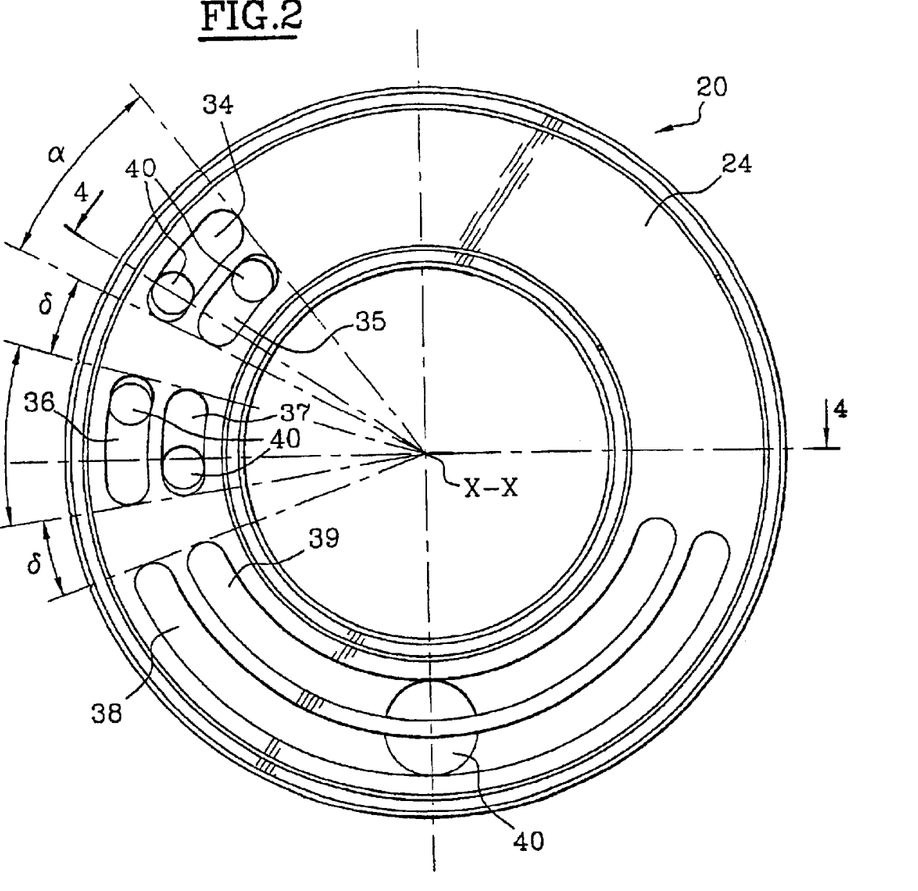
FIG. 2 is a view of the distributor's stationary crown's contact surface for a machine according to the invention.

The stationary crown 20 is provided with, on its contact surface 22, two series of lights along the arc of a circle. One first set of lights 34, 36, 38 is fitted on the same large-diameter circle as are the even ports 28, white the second series of lights 35, 37, 39 are fitted on the same small circle as the odd ports 29.

Lights 34, 35 are connected respectively to pumps A1 and A2 serving for the first pumping stage.

Lights 36, 37, are connected respectively to pumps B1 and B2 serving for the second pumping stage.

Lights 38, 39 are on the contrary, both connected to pump C, which serves for the coating stage.

Each of the lights 34, 35, 36, 37, 38, 39, is connected to the pump associated by means of two corresponding ports 40, which terminate in lower face 42 of stationary crown 20, and to which some conduits are coupled (not shown).

With this kind of distributor setup, it is thus understood that all the ports of one same series follow the same circular trajectory as the rotation of the rotating crown, and therefore, that they successively come into line with all the lights of the corresponding series. In such a way, that when a port finds itself in line with a light, the corresponding station to this port finds itself connected to the pump associated with that light. It is an advantage that contact surfaces 24, 26 are polished to such a degree that they form a seal by mere contact, without it being necessary to resort to any other means of sealing. However, the plan is nonetheless, to put a film of lubricating agent between the two contact surfaces, not only to prevent the gripping of the two surfaces, but also to limit overheating, and to guarantee a tight seal.

FIG. 2 shows two lights which correspond to the same stage of treatment, and which belong to the two different series, fitted on the same angular displacement.

However, it is also possible that two lights that correspond to the same stage, might be angularly staggered and that on the contrary, two consecutive stations on the carousel might be provided with ports which, being on different diameters, would be aligned angularly relative to the X-X axis.

As for lights 34, 35, 36, 37 corresponding to the primary and to the secondary pumping stages, they cover an angular displacement a which is less than the angular distance β which separates two consecutive ports 28, 29 of a same series, this for the purpose of avoiding, during the course of these two stages, that two stations might be connected at the same time to the same pump.

Otherwise, two lights of one same series are separated from each other by an angular displacement of δ, such that one port cannot simultaneously be in line with, even partially, two lights.

The function of distributor 18 according to the invention, is now described with reference to FIGS. 5 through 8. These figures are diagrams which give a picture of two lights 34, 35 which correspond to the first stage of pumping described above, and on which one has superimposed the image of the four ports 28, 29 corresponding to four consecutive stations of the machine described above. The different diagrams illustrate different successive positions of the ports in relation to the lights, and thus different angular positions relative to the two crowns 20, 22 of the distributor.

Figure 5:
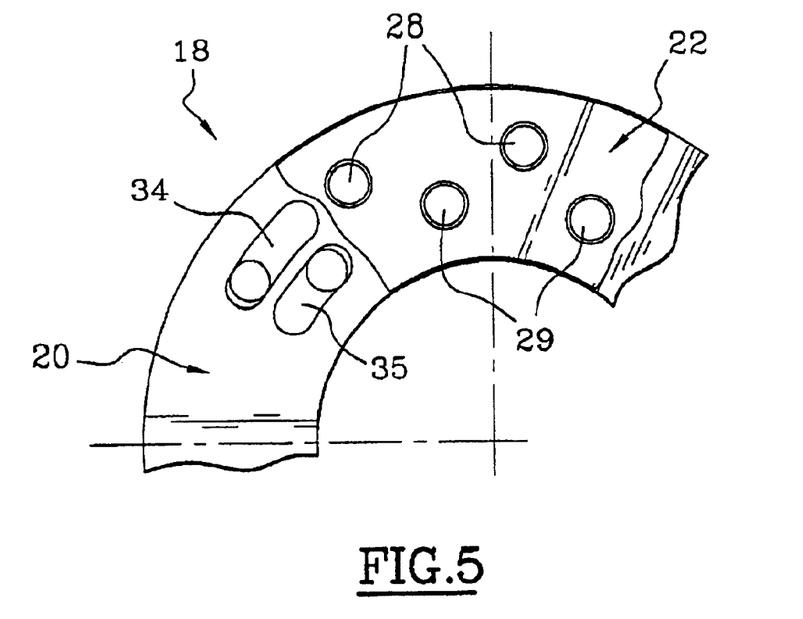
FIGS. 5 to 8 are diagrams illustrating different positions relative to certain of the rotating crown's ports, with the lights of the distributor's stationary crown.

The position illustrated in FIG. 5, is shown just before any of the four ports 28, 29, have come into line with their corresponding light.

Figure 6:
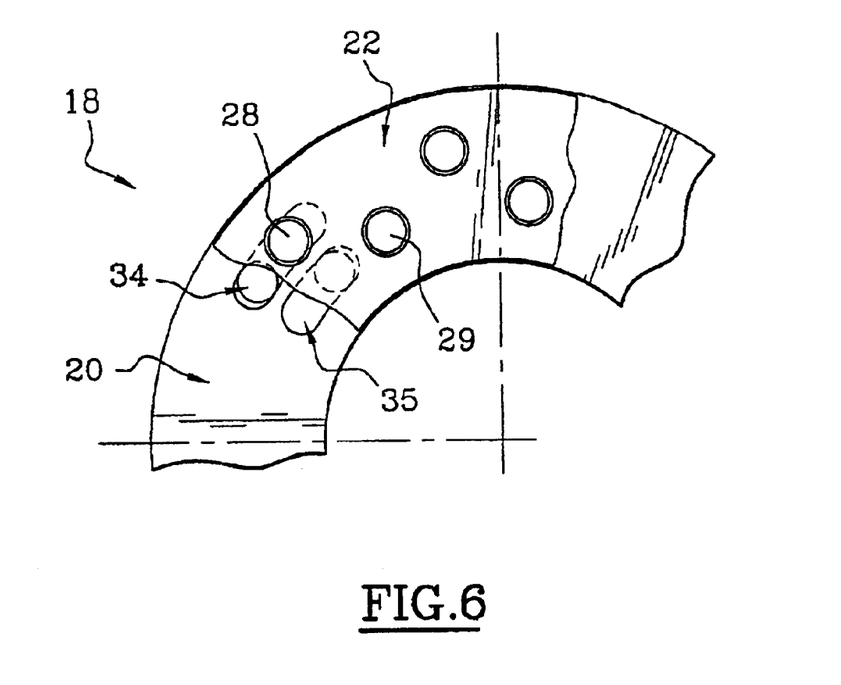

In FIG. 6, it is seen that the rotating crown has moved angularly in such a way that the first of the ports, in this case port 28, corresponding to an even station, has come into line with light 34, even though the first of the four stations, which is associated with this port, has been connected to pump A1 and has thus completed the first stage of pumping. One can notice that at this instant, no other station has completed this same pumping stage.

Figure 7:
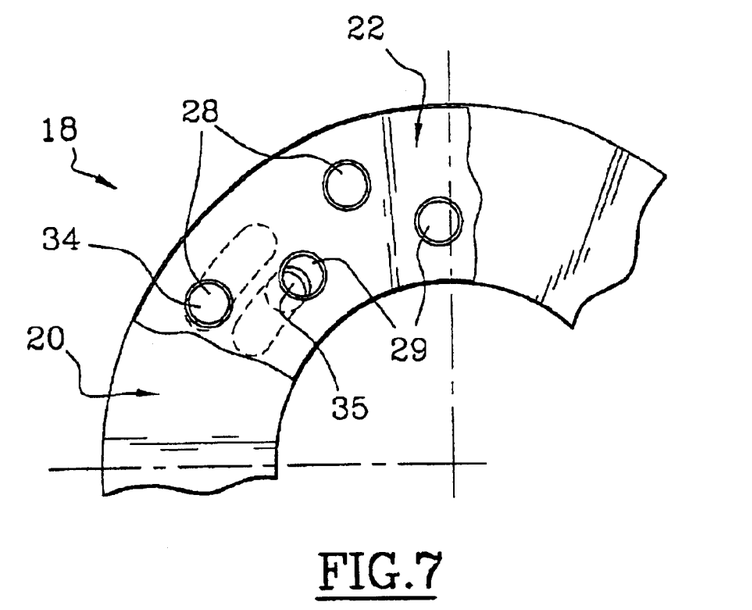

On the contrary, in FIG. 7, you can see that, after crown 22 has rotated, the first odd port, which follows the even port, previously under consideration, has also reached the corresponding light 35. In that way, the station, which is associated with that light, is connected to the pump A2. At this instant, the first even port is still lined up with light 34, while the second even port, which corresponds to the third of the four stations, has not yet arrived in line with light 34.

Figure 8:
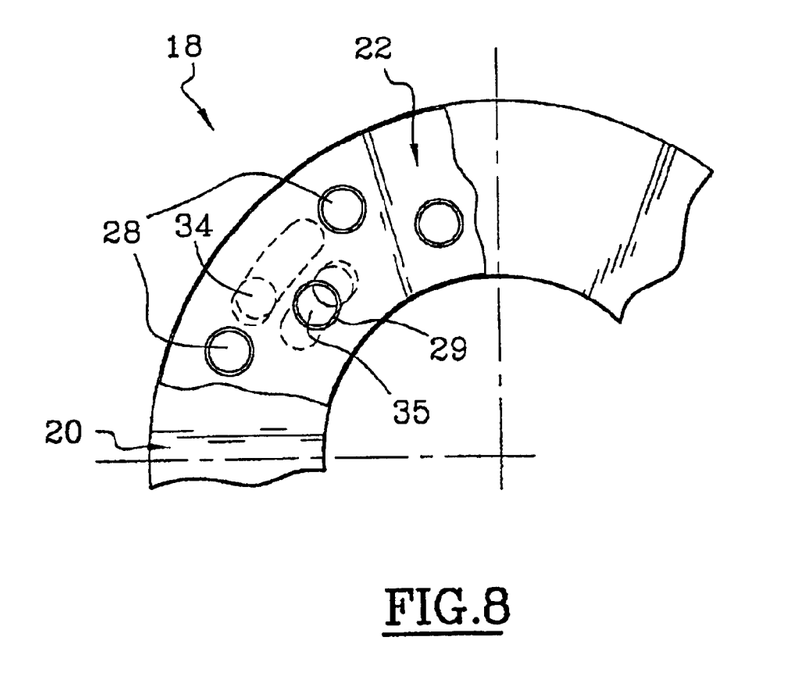

Finally, we have illustrated in FIG. 8 a subsequent position of the rotating crown 22, in which the first odd port is still lined up with light 34. The first even port, on the contrary, has moved out of the angular displacement covered by light 34, and the second even port has not yet entered it. In such a way, pump A2 does not find itself, at that instant, connected to any station.

We have described and illustrated the preferred way of achieving a rotating distributor in which the crowns are coaxial but superimposed axially, the contact surfaces being thus flat transversal planes.

It was chosen to place the mobile crown above the stationary crown. Nonetheless, it is possible to reverse these two crowns.

As a variant, one could also achieve the rotating distributor by placing the two crowns in a concentric fashion, the one crown being received radially within the other. In such a case, the contact surfaces would be internal and external cylindrical faces, and the series of groups of ports would be staggered according to the direction of the X-X axis.

In every case, because of the invention, one can have at the same, stations which are in very close angular proximity to each other, hence there are a great number of stations on carousel 16 to be found; and that the treatment stage is relatively long for each station, all the while completely maintaining the efficacy of the pressure source, in this case, pumps, while ensuring that one pressure source is never connected to two stations at the same time. Moreover, the two crowns, 20, 22, being annular, it would be possible to provide for other devices, passing through their centers, needed for the functioning of the machine. Notably, one could imagine a machine involving a significant number of stations, and provided with two rotating distributors of the type described above.

What is claimed is:

1. A carousel machine comprising:
    a carousel on which a plurality of treatment stations (12, 13) are provided, the treatment stations for treating a hollow container, the treatment stations being segregated into at least two groups;
    a distribution device (18) coupling the treatment stations to a pressure source during a treatment stage;
    wherein the pressure source includes at least two pumps (A1, A2) for providing sources of independent and equivalent pressure to the treatment stations during the treatment stage; and
    wherein the distribution device (18) couples each of the at least two pumps (A1, A2) to only one distinct group of treatment stations, such that only one of the pumps (A1) is connectable to only one group of treatment stations (12) and the other pump (A2) is connectable to only the other group of treatment stations (13).

2. A machine according to claim 1, wherein the distribution device is configured such that, at any instant, one of the pumps is connected to, at most, one treatment station.

3. A machine according to claim 1, wherein the distribution device (18) configured such that at least one station (12) of a group is connected to an associated pump (A1), while at least one station (13) of another group is connected to an associated pump (A2).

4. A machine according to claim 1, wherein the distribution device includes a swivel coupling having as many routes as the machine has pumps for separately feeding the groups of treatment stations, and wherein the distribution device includes, downstream of the swivel coupling, a plurality of individual valves associated with each treatment station.

5. A carousel machine for the treatment of hollow containers, the machine including a carousel provided with identical treatment stations (12, 13) whose purpose is to treat at least one hollow container, and of the type in which, for at least one stage of treatment, the treatment station is connected to a pressure source by a distribution device involving a sealed swivel coupling, wherein, for the stage, the machine comprises at least two sources of independent and equivalent pressure (A1, A2), and that the treatment stations are distributed into as many groups (12, 13) as the machine involves sources, and wherein the distribution device (18) is such that each source (A1, A2) is associated with a distinct group of treatment stations, and wherein the sealed swivel coupling is a rotating distributor (18) involving two coaxial crowns including a stationary crown (20) and a rotating crown (22), which are in contact with each other in a sealed manner at adjacent contact surfaces (24, 26), wherein the rotating crown (22) has communication ports (28, 29), which are each connected to a treatment station (12, 13), which are distributed in at least as many series as the machine has sources for the stage; and which terminate in the contact surface (26) of the rotating crown (22), and the communication ports of one same series, all correspond to treatment stations of one same group, and follow the same trajectory, while the communication ports of the two different series follow different trajectories, wherein the stationary crown (20) has lights (34, 35) which are connected to the pressure sources (A1, A2), each of which terminates at the contact surface (24) of the stationary crown (20) in such a way as to be on the trajectory of a series of communication ports (28, 29) of the rotating crown (22), such that one treatment station is connected to a pressure source when the corresponding communication port is in line with a light associated with this source, wherein the stationary crown has at least as many distinct series of at least one light, as the number of the series of communication ports, and wherein the two sources of pressure (A1, A2) are each connected to a light of two distinct series of lights (34, 35) of the stationary crown (20).

6. A machine according to claim 5, wherein the communication ports (28, 29) of all the treatment stations (12, 13) of one same group, belong to the same series.

7. A machine according to claim 6, wherein the contact surfaces (24, 26) of the two crowns (20, 22) are annular faces perpendicular to an axis of rotation (X—X) of the carousel (16).

8. A machine according to claim 7, wherein the communication ports (28, 29) of one same series are positioned along a circle, and wherein the two series of communication ports (28, 29) are positioned according to two circles of different diameters.

9. A machine according to claim 8, wherein the communication ports (28, 29) of one same series are distributed angularly in a regular fashion around the axis of rotation (X—X) of the carousel (16), and wherein the communication ports (28, 29) of two different series involving the same number of communication ports are intercalated angularly.

10. A machine according to claim 8, wherein the lights (34, 35) corresponding to two independent and equivalent sources of pressure (A1, A2), and utilized for said stage, are fitted with an angular displacement ($\alpha$) and on different diameters, corresponding respectively to the diameters of circles according to which the series of communication ports (28, 29) are fitted, corresponding to the sources.

11. A machine according to claim 10, wherein two consecutive communication ports of one same series are angularly separated by an angular displacement ($\beta$) at least equal to the angular displacement ($\alpha$) on which is mounted the corresponding light of the series.

12. A machine according to claim 5, wherein during a second stage of treatment, the treatment stations (12, 13) are connected, by means of the rotating distributor (18), with secondary sources of pressure (B1, B2) to attain a second level of pressure, in that the stationary crown (20) includes, by extending each of the first lights (34, 35), secondary lights (36, 37) which are connected each to a respective secondary pressure source (B1, B2), and wherein the two lights associated with the same series of communication ports (28, 29) are separated by an angular displacement ($\delta$) which prevents the simultaneous connection of one communication port with two lights.

13. A machine according to claim 1, wherein the sources of pressure (A1, A2) are at a pressure less than atmospheric pressure.

14. A machine according to claim 1, wherein the treatment includes a stage for which a cold, low-pressure plasma is created, for the purpose of coating the hollow container, and at least one pumping stage for lowering the internal pressure of the treatment stations, and wherein the independent and equivalent pressure sources which allow for the realization of the pumping stage, consist of at least two pumps (A1, A2).

15. A rotating distributor for a carousel machine for treatment of hollow containers, the machine involving several identical treatment stations (12, 13) each one designed to treat at least one hollow container, wherein the rotating distributor (18) has two coaxial crowns including a stationary crown (20) and a rotating crown (22), which are in contact with each other in a sealed manner, by way of adjacent contact surfaces (24, 26), wherein the rotating crown (22) includes communication ports (28, 29) which are connectable to a treatment station, and which terminate on the contact surface of the rotating crown, wherein the stationary crown (20) includes at least one light which is connectable to a pressure source of the machine, and which terminates on the contact surface of the stationary crown in such a way as to be on the trajectory of the communication ports of the rotating crown, in such a way that one treatment station is connected to the pressure source when the corresponding communication port finds is in line with the light, wherein the communication ports of the rotating crown are distributed into at least two series (28, 29), the communication ports of one same series follow the same trajectory while the communication ports of two different series follow different trajectories, wherein the stationary crown (20) has as many distinct series of at least one light, as the number of the series of communication ports, each of the lights being fitted on the trajectory of one of the series of communication ports, and the two independent and equivalent pressure sources are each connected to one light of two distinct series.

16. A rotating distributor according to claim 15, wherein the contact surfaces (24, 26) of the two crowns are annular faces, perpendicular to an axis of rotation (X—X) of the rotating crown (22).

17. A rotating distributor according to claim 16, wherein the communication ports (28, 29) of one same series are fitted along a circle, and in that the two series of communication ports are fitted according to two circles of different diameters.

18. A rotating distributor according to claim 15, wherein the communication ports (28, 29) of one same series are distributed angularly in a regular manner around an axis of rotation (X—X), and in that the communication ports of the two different series involving the same number of ports are intercalated angularly.

19. A rotating distributor according to claim 17, wherein the lights (34, 35) corresponding to two sources of pressure (A1, A2) are fitted on the same angular displacement ($\alpha$) and on the different diameters corresponding respectively to the diameters of the circles according to which are fitted the series of communication ports (28, 29) corresponding to the sources of pressure.

20. A rotating distributor according to claim 17, wherein two consecutive communication ports of one same series (28, 29), are separated by an angular displacement ($\beta$) at least equal to the angular displacement ($\alpha$) on which is fitted the light (34, 35) corresponding to the series of communication ports.

21. A rotating distributor according to claim 15, wherein the stationary crown includes, for each series of lights, at least two more lights (34, 36) one following the other, and in that these two lights (34, 36) of one same series, are separated by an angular displacement ($\delta$) preventing the simultaneous connection one communication port with two lights.

* * * * *